US006663686B1

(12) United States Patent
Geiger et al.

(10) Patent No.: US 6,663,686 B1
(45) Date of Patent: Dec. 16, 2003

(54) CONTROLLED RELEASE FERTILIZER AND METHOD FOR PRODUCTION THEREOF

(75) Inventors: Albert J. Geiger, Fort Saskatchewan (CA); Eugene G. Stelmack, Fort Saskatchewan (CA); Nicolette M. Babiak, Gibbons (CA)

(73) Assignee: Agrium, Inc. (CA)

(*) Notice: Subject to any disclaimer, the term of this patent is extended or adjusted under 35 U.S.C. 154(b) by 329 days.

(21) Appl. No.: 09/604,161

(22) Filed: Jun. 27, 2000

(51) Int. Cl.$^7$ ................................................ C08G 18/36
(52) U.S. Cl. .................... 71/28; 71/64.07; 71/64.11; 525/131; 524/871
(58) Field of Search .................... 525/131; 71/64.07, 71/64.11, 28; 524/871

(56) References Cited

U.S. PATENT DOCUMENTS

| | | | |
|---|---|---|---|
| 3,223,518 A | 12/1965 | Hansen | 71/64.07 |
| 3,252,786 A | 5/1966 | Bozzelli et al. | 71/64.07 |
| 3,276,857 A | 10/1966 | Stansbury et al. | 71/64 |
| 3,748,115 A | 7/1973 | Sommer et al. | 71/64 F |
| 4,019,890 A | 4/1977 | Fujita et al. | 71/64 F |
| 4,400,374 A | 8/1983 | Cardarelli | 424/78 |
| 4,438,593 A | 3/1984 | McNew et al. | 47/57.6 |
| RE32,356 E | 2/1987 | Cardarelli | 424/78 |
| 4,711,659 A | 12/1987 | Moore | 71/93 |
| 4,804,403 A | 2/1989 | Moore | 71/28 |
| 4,988,377 A | 1/1991 | Manalastas et al. | 71/28 |
| 5,147,442 A | 9/1992 | Kosuge et al. | 71/64.07 |
| 5,472,712 A | 12/1995 | Oshlack et al. | 424/480 |
| 5,538,531 A | 7/1996 | Hudson et al. | 71/28 |
| 5,580,578 A | 12/1996 | Oshlack et al. | 424/468 |
| 5,803,946 A | 9/1998 | Petcavich et al. | 71/64.11 |
| 5,858,094 A | 1/1999 | Detrick et al. | 118/303 |
| 6,039,781 A | 3/2000 | Goertz et al. | 71/1 |
| 6,231,633 B1 * | 5/2001 | Hirano et al. | |

FOREIGN PATENT DOCUMENTS

| | | |
|---|---|---|
| CA | 2272480 | 5/1990 |
| EP | 0 025 780 | 3/1981 |
| EP | 0 867 422 | 9/1998 |
| JP | 0052038361 AA | 3/1977 |
| JP | 04208781 | 3/1994 |
| JP | 06300965 | 6/1994 |
| JP | 04347086 | 12/1994 |
| JP | 05213192 | 3/1995 |

* cited by examiner

Primary Examiner—Rachel Gorr
(74) Attorney, Agent, or Firm—Katten Muchin Zavis Rosenman

(57) ABSTRACT

A controlled release fertilizer material comprising a particulate plant nutrient surrounded by a coating which is the reaction product of a mixture comprising: a polyol, an isocyanate and an organic wax.

55 Claims, 1 Drawing Sheet

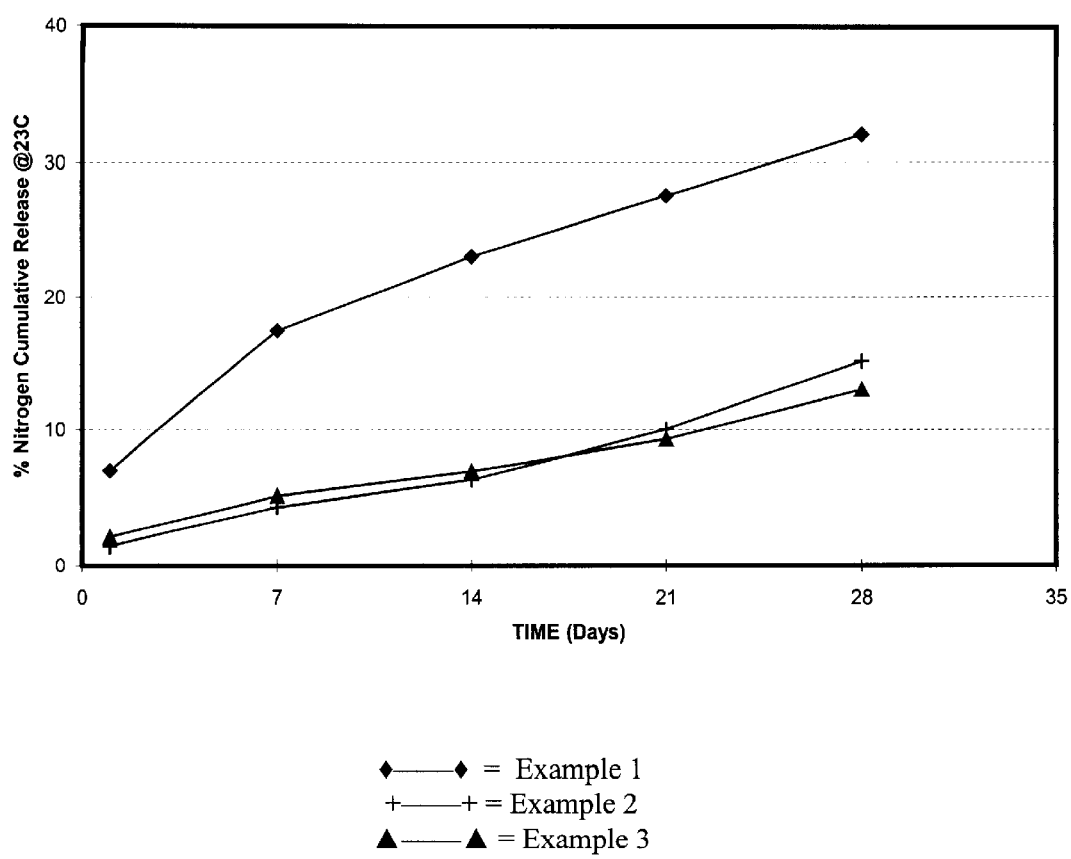
Figure

CONTROLLED RELEASE FERTILIZER AND METHOD FOR PRODUCTION THEREOF

BACKGROUND OF THE INVENTION

1. Field of the Invention

The present invention relates to a controlled release fertilizer and to a method for production thereof.

2. Description of the Prior Art

Fertilizers have been used for many years to supplement nutrients in growing media.

In recent years the art has focused on techniques to deliver controlled amounts of plant nutrients to the soil or other growing media. This has been done so that, on one hand, the growing plants are not adversely deprived of nutrients and, on the other hand, an over supply of nutrients is avoided. An over supply of nutrients can result in toxicity to the plants or losses from leaching. The resulting improvement in FUE (fertilizer use efficiency) can reduce the rate and the frequency of nutrient application.

U.S. Pat. No. 5,538,531 [Hudson et al. (Hudson)] and the prior art cited therein provides a useful overview of methods of conveying controlled release properties to a particulate plant nutrient. Specifically, Hudson teaches a controlled release, particulate fertilizer product having a water soluble fertilizer central mass encased in a plurality of water insoluble, abrasion resistant coatings. At least one inner coating is a urethane reaction product derived from recited isocyanates and polyols. The outer coating is formed from an organic wax having a drop melting point in the range of from 50° C. to 120° C. The general teachings of Hudson and those of the Examples in Hudson make it clear that the Hudson process involves curing the urethane coating(s) around the particulate plant nutrient and, thereafter, applying to the cured urethane coating(s) the outer layer of organic wax.

It is also known in the art to pre-coat particulate plant nutrient with an organic wax or similar material as a means to regular or otherwise improve the surface of the particulate plant nutrient prior to coating thereof with the urethane forming reagents.

Despite these advances in the art, there is still room for improvement. Specifically, it would be desirable to have a controlled release fertilizer and process for production thereof which would allow for the ready customization of the release rate profile of a given particulate plant nutrient having applied thereto a given amount of urethane coating (s). It would also be desirable to be able to achieve a desirable release rate profile for a given particulate plant nutrient using significantly reduced amounts of coating materials.

SUMMARY OF THE INVENTION

It is an object of the present invention to provide a novel controlled release fertilizer which obviates or mitigates at least one of the above-mentioned disadvantages of the prior art.

Accordingly, in one of its aspects the present invention provides a controlled release fertilizer material comprising a particulate plant nutrient surrounded by a coating which is the reaction product of a mixture comprising: a polyol, an isocyanate and an organic wax.

In another of its aspects, the present invention provides a process for producing a controlled release fertilizer material comprising the steps of:

(a) contacting a particulate plant nutrient with a mixture comprising: a polyol, an isocyanate and an organic wax to produce a coating surrounding the particulate plant nutrient; and (b) curing the coating to produce the controlled release fertilizer material.

Thus, we have surprisingly and unexpectedly discovered that an improved controlled release fertilizer material and process for production thereofmay be achieved from a coating which is the reaction product of a mixture comprising: a polyol, an isocyanate and an organic wax. Specifically, while it is known use wax as a pre-coat before application ofthe urethane layer and/or as post-coat after application of the urethane layer, the advantages of incorporating the wax with the urethane forming reagents has heretofore been unknown. This advantages include:

(i) the ability to extend the release rate profile for a give plant nutrient having a given amount of urethane coating thereon;

(ii) the ability to achieve a desirable release rate profile using significantly less coating that used with comparable prior art coating techniques; and (iii) the ability to obtain such a product via one-step process (i.e., compared to the multi-step processes of the prior art).

Other advantages will become apparent to those of skill in art having the present specification in hand.

BRIEF DESCRIPTION OF THE DRAWING

Embodiments of the present invention will be described with reference to the accompanying FIGURE in which there is illustrated the release rate profile a controlled release fertilizer in accordance with the present invention and the release rate profiles of prior art controlled release fertilizers.

DETAILED DESCRIPTION OF THE PREFERRED EMBODIMENTS

Accordingly, in one of its aspects, the present invention relates to a controlled release fertilizer material comprising a particulate plant nutrient surrounded by a coating.

The choice of particulate plant nutrient material useful for the present controlled release fertilizer material is not particularly restricted and is within the purview of a person skilled in the art.

For example, the plant nutrient material used may selected from those disclosed in Hudson. Preferably, such a plant nutrient comprises a water soluble compound, more preferably a compound containing at least one member selected from the group consisting of nitrogen, phosphorus, potassium, sulfur and mixtures thereof. A preferred such plant nutrient comprises urea. Other useful examples of plant nutrients are taught in U.S. Pat. No. 5,571,303 [Bexton]—e.g., ammonium sulfate, ammonium phosphate and mixtures thereof.

Preferably, the coating surrounds the plant nutrient material in an amount in the range of from about 1.0 to about 10 percent by weight, more preferably from about 1.5 to about 5.0 percent by weight, most preferably from about 2.0 to about 4.0 percent by weight, based on the weight of the plant nutrient material.

The coating is the reaction product of a mixture comprising: a polyol, an isocyanate and an organic wax.

The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, such a polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising polyethylene glycols, adipic acid-ethylene glycol polyester, poly(butylene glycol), poly(propylene glycol) and hydroxyl-terminated polybutadiene—see, for example, British patent No. 1,482,213. The most preferred such polyol is a polyether polyol. Preferably, such a polyether polyol has a molecular weight in the range of from about 200 to about 20,000, more preferably from about 2,000 to about 10,000, most preferably from about 2,000 to about 8,000.

A particularly preferred class of polyols are those disclosed in Hudson. Preferably, such a polyol comprises from about 2 to about 6 hydroxyl moieties. More preferably, such a polyol comprises at least one $C_{10}$–$C_{22}$ aliphatic moiety. Most preferably, the polyol comprises castor oil.

Additionally, the polyol may be derived from natural sources such as soybean, corn, canola and the like (i.e., to produce naturally occurring modified oils). An example of such a synthetic polyol comprising a canola base is commercially available from Urethane Soy Systems Corp. (Princeton, Ill.).

The isocyanate suitable for used in producing the coating is not particularly restricted and the choice thereof is within the purview of a person skilled in the art. Generally, the isocyanate compound suitable for use may be represented by the general formula:

$Q(NCO)_i$ wherein i is an integer of two or more and Q is an organic radical having the valence of i. Q may be a substituted or unsubstituted hydrocarbon group (e.g. an alkylene or arylene group). Moreover, Q may be represented by the general formula:

$Q^1$—Z—$Q^1$ wherein $Q^1$ is an alkylene or arylene group and Z is chosen from the group comprising —O—, —O—$Q^1$—, —CO—, —S—, —S—$Q^1$—S— and $SO_2$—. Examples of isocyanate compounds which fall within the scope of this definition include hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate and isopropylbenzene-alpha-4-diisocyanate.

In another embodiment, Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as discussed hereinabove) with an active hydrogen-containing compound (as discussed hereinabove), preferably the polyhydroxyl-containing materials or polyols discussed above. In this embodiment, the polyisocyanate may be, for example, used in proportions of from about 30 percent to about 200 percent stoichiometric excess with respect to the proportion of hydroxyl in the polyol.

In another embodiment, the isocyanate compound suitable for use in the process of the present invention may be selected from dimers and trimers of isocyanates and diisocyanates, and from polymeric diisocyanates having the general formula:

$[Q''(NCO)_i]_j$ wherein both i and j are integers having a value of 2 or more, and Q'' is a polyfunctional organic radical, and/or, as additional components in the reaction mixture, compounds having the general formula:

$L(NCO)_i$ wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si-NCO group, isocyanate compounds derived from sulphonamides ($QSO_2NCO$), cyanic acid and thiocyanic acid.

See also, for example, British patent No. 1,453,258.

Non-limiting examples of suitable isocyanates include: 1,6-hexamethylene diisocyanate, 1,4-butylene diisocyanate, furftirylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalenediisocyanate, 1-methyl-2,4-diisocyanate-5-chlorobenzene,2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

A particularly preferred group of isocyanates are those described in Hudson.

Preferably, the polyol and isocyanate are used in amounts such that the ratio of NCO groups in the isocyanate to the hydroxyl groups in the polyol is in the range of from about 0.8 to about 3.0, more preferably from about 0.8 to about 2.0, most preferably from about 0.9 to about 1.1.

The wax used in the mixture to produce the coating may be selected from those described in Hudson and from silicon waxes (commercially available from Dow Corning). Thus, the preferred wax comprises a drop melting point in the range of from about 50° C. to about 120° C. More preferably, the wax is substantially non-tacky below a temperature of about 40° C. Most preferably, the wax comprises a $C_{30+}$ alpha olefin.

Preferably, the organic wax is present in the mixture in an amount of up to about 50 percent by weight, based on the combined weight of the organic wax and the polyol. More preferably, the organic wax is present in the mixture in an amount in the range of from about 1.0 to about 25 percent by weight, based on the combined weight of the organic wax and the polyol. Most preferably, the organic was is present in the mixture in an amount in the range of from about 2.0 to about 10 percent by weight based, on the combined weight of the organic wax and the polyol.

Step (a) in the present process comprises contacting a particulate plant nutrient with a mixture comprising: a polyol, an isocyanate and an organic wax to produce a coating surrounding the particulate plant nutrient. The precise mode of applying the mixture to the plant nutrient is not particularly restricted—see for, example column 5, lines 31–63 of Hudson.

In the present process, it is preferred to conduct Step (a) at a temperature in the range of from about 50° C. to about 105° C., more preferably in the range of from about 60° C. to about 90° C., most preferably in the range of from about 70° C. to about 80° C.

Preferably, Step (a) comprises contacting the particulate plant nutrient with a first stream comprising the polyol and a second stream comprising the isocyanate, the first stream and the second stream being independent of one another. More preferably, the first stream comprises a mixture of the polyol and the organic wax. In this embodiment, the particulate plant nutrient may be contacted simultaneously with the first stream and the second stream. Alternatively, the particulate plant nutrient with the first stream followed by the second stream. In a further preferred embodiment, Steps (a) and (b) of the present process are repeated at least once to produce a controlled release fertilizer material having a plurality of coating layers.

Embodiments of the present invention will be illustrated with reference to the following Examples which should not be used to limit or construe the invention.

EXAMPLE 1

In this Example, a controlled release fertilizer material was prepared according to the teachings of U.S. Pat. No. 5,538,531 [Hudson et al. (Hudson)]. Accordingly, it will be recognized that this Example is provided for comparative purposes only and is outside the scope of the present invention.

The apparatus used in this Example was capable of applying coating components to a 7.5 kg batch. The apparatus consisted of a Plexiglas horizontal drum 16 inches in diameter and 20 inches in length. The drum end plates had a central 5 inch hole through which the coating components and the substrate are added. The drum internals consisted of four A substantially evenly spaced longitudinal baffles, each baffle being about 1 inch in height. The drum was rotated at 75 fpm peripheral speed or about 18 rpm using a Separ™, variable speed drive, horizontal drum roller. The internal temperature of the drum and substrate was maintained at about 75° C. using variable setting electric heating guns. The heating guns were positioned to direct hot air through the holes in the drum end plates.

The coating components were added at a substantially consistent rate using individual Masterflex™ peristaltic pumps and a modified Amacoil™ Machinery auto-sampler. The sampler portion was removed and an individual stainless steel tubing for each component was attached to the drive assembly. This allowed the coating components to be distributed the full length of the drum at a substantially constant travel speed.

The substrate used in this Example was granulated urea (46-0-0). This substrate had a SGN (Size Guide Number) of 240. The substrate (7.5 kg) was preheated in an oven to about 75° C. and was allowed to roll in the coating drum until the temperature has stabilized to 75° C.

The polyol used in this Example was commercially available castor oil in an amount of 42.95 g. The isocyanate used in this Example was polymeric diphenylmethane diisocyanate (BASF PAPI No. 17) in an amount of 19.52 g. The two components are simultaneously added to the coating apparatus through individual lines or pipettes near the top of the rolling bed. The 2.5 weight percent coat was applied to the substrate in three substantially equal layers with about six minutes between application if each layer—i.e., the weight of the total coat was 2.5 weight percent based on the weight of the substrate.

A $C_{30+}$ alpha olefin wax commercially available from Chevron was pre-heated to about 150° C. and then was applied in a single layer to the urethane coated substrate. The wax was used in an amount to provide a weight of 1.5 weight percent based on the weight of the substrate. Six minutes after the wax was applied, the drum and contents are cooled with a controlled stream of pressurized air to about 35° C.

Thus, in this Example, the sum of the urethane coat and the wax layer was 4 weight percent based on the weight of the substrate.

The water release rate profile for the controlled release fertilizer material was then determined. In the analysis, a Technicon AutoAnalyzerm was calibrated and used pursuant to the teachings ofAutomatedDetermination of Urea andAmmoniacal Nitrogen (University of Missouri, 1980). The following procedure was used:

1. Accurately weigh 15 grams (±0.1 mg) of the sample into a weigh dish. Record the weight of sample. Transfer the sample to 125 mL Erlenmeyer flask.
2. Add 75 mL of demineralized water and stopper the flask.
3. Gently swirl the sample and water until all the particles are submersed.
4. Let the sample stand for a specified time at a constant temperature (typically at room temperature).
5. Gently swirl the flask to mix the solution and decant only the solution to a 100 mL volumetric flask.
6. Rinse the sample with demineralized water adding to the volumetric flask.
7. Bulk to volume of volumetric flask and mix thoroughly.
8. If the test is to be repeated for another time period, repeat starting at Step 2.
9. Once the Technicon AutoAnalyzer II is on line, transfer some of this solution (or perform the required dilutions if necessary) to the Technicon sample cups for analysis.
10. Record the results as parts per million N—$NH_3$ (read directly from a Shimadzu Integrator).

EXAMPLE 2

The methodology in Example 1 was repeated with the exception that, prior to application ofthe urethane forming polyol and isocyanate, the substrate was pre-coated with the $C_{30+}$ alpha olefin wax (pre-heated to about 150° C.) applied as a single layer. The wax was used in an amount to provide a weight of 0.3 weight percent based on the weight of the substrate. Accordingly, it will be recognized that this Example is provided for comparative purposes only and is outside the scope of the present invention.

A three-layer polyurethane coating as applied to the pre-coated substrate as described in Example 1 (44.0 g castor oil and 18.4 g isocyanate). Again, the weight of the total polyurethane coat was 2.5 weight percent based on the weight of the substrate. A 600 g portion of the urethane coated substrate was removed.

Thereafter, a three-layer coating of the $C_{30+}$ alpha olefin wax (pre-heated to about 150° C.) was applied to the remaining urethane coated substrate. The wax was used in an amount to provide a weight of 1.5 weight percent based on the weight ofthe substrate (in this case, about 35 g was per layer of the three-layer coating).

The water release rate profile for the controlled release fertilizer material was then determined using the test procedure described above in Example 1.

EXAMPLE 3

In this Example, a controlled release fertilizer was prepared in accordance with the present invention.

The apparatus used to apply the coating components was a SS horizontal insulated drum having a 12 inch diameter a 5½ inches in width. An enclosed back plate was attached to a variable speed drive. The front plate had a central 8inch opening through which the substrate and the coating components are added. The drum internals consist of four substantially evenly spaced longitudinal baffles, each about ½ inch high. The drum was rotated at 75 fpm peripheral speed or about 24 rpm. The internal temperature of the drum and substrate was maintained at about 75° C. using a variable setting electric heating gun. The coating components are added using individual automatic macro pipettes capable of adding ⅓ the weight of each coating component in a single addition.

The same substrate (1 kg) as used in Examples 1 and 2 was pre-heated to 75° C. in the (smaller) apparatus described above. Castor oil (5.63 g) at 140° C. was mixed with $C_{30+}$ alpha olefin wax (0.33 g). A coating was applied to the substrate consisting of three layers of 5.96 g (5.5 wt. % $C_{30+}$ in castor oil) of the castor oil/wax mixture and 2.35 g isocyanate added simultaneously for a total coating weight of 2.5%. The time period between application of successive layers of urethane was approximately 6 minutes. Six minutes after the final urethane layer was applied the product was cooled.

The water release rate profile for the controlled release fertilizer material was then determined using the test procedure described above in Example 1.

The water release rate profiles for the controlled release fertilizer material produced in Examples 1–3 are illustrated in the accompanying FIGURE.

As shown, when it is desired to have material with a release profile of nitrogen extending over 6–8 months, the water release rate profile for the material produced in Example 3 (the invention) is significantly better than that for the material produced in Example 1 (the Hudson material). Further, this was achieved using significantly less coating in Example 3 (2.5 weight percent based on the weight of the substrate) compared with Example 1 (4.0 weight percent based on the weight of the substrate).

With reference to Example 2 (wax pre-coat and post-coat), while the water release rate profile is closer to that achieved in Example 3 (the invention), this was achieved using a three-step process whereas the material of Example 3 was made using a one-step process.

Accordingly, the material of Example 3 and the production thereof is a significant advance over the prior art.

While the present invention has been described in detail, including reference to the Examples, it will of course be readily understood that a number of modifications to the exemplified embodiment will be apparent to those of skill in the art with this specification in hand, which modifications do not depart from the spirit and scope of the present invention.

All publications, patents and patent applications referred to herein are incorporated by reference in their entirety to the same extent as if each individual publication, patent or patent application was specifically and individually indicated to be incorporated by reference in its entirety.

What is claimed is:

1. A controlled release fertilizer material comprising a particulate plant nutrient surrounded by a coating which is the reaction product of a mixture comprising: a polyol, an isocyanate and an organic wax; wherein the polyol comprises castor oil.

2. The controlled release fertilizer material defined in claim 1, wherein the plant nutrient comprises a water soluble compound.

3. The controlled release fertilizer material defined in claim 2, wherein the water soluble compound comprises a compound containing at least one member selected from the group consisting of nitrogen, phosphorus, potassium, sulfur and mixtures thereof.

4. The controlled release fertilizer material defined in claim 1, wherein the plant nutrient comprises urea.

5. The controlled release fertilizer material defined in claim 1, wherein the polyol comprises from about 2 to about 6 hydroxyl moieties.

6. The controlled release fertilizer material defined in claim 1, wherein the polyol comprises at least one $C_{10}$–$C_{22}$ aliphatic moiety.

7. A controlled release fertilizer material comprising a particulate plant nutrient surrounded by a coating which is the reaction product of a mixture comprising: a polyol, an isocyanate and an organic wax, wherein the polyol comprises at least one $C_{10}$–$C_{22}$ aliphatic moiety.

8. The controlled release fertilizer material defined in claim 1, wherein the isocyanate is selected from the group consisting of diphenylmethane diisocyanate, toluene diisocyanate, aliphatic isocyantes, derivatives thereof, polymers thereof and mixtures thereof.

9. The controlled release fertilizer material defined in claim 1, wherein the isocyanate contains from about 1.5 to about 3.0 isocyanate groups per molecule.

10. The controlled release fertilizer material defined in claim 1, wherein the isocyanate contains from about 10% to about 50% NCO.

11. The controlled release fertilizer material defined in claim 1, wherein the isocyanate comprises polymeric diphenylmethane diisocyanate.

12. The controlled release fertilizer material defined in claim 1, wherein the organic wax comprises a drop melting point in the range of from about 50° C. to about 120° C.

13. The controlled release fertilizer material defined in claim 1, wherein the organic wax is substantially non-tacky below a temperature of about 40° C.

14. The controlled release fertilizer material defined in claim 1, wherein organic wax comprises a $C_{30+}$ alpha olefin.

15. The controlled release fertilizer material defined in claim 1, wherein the coating is present in an amount in the range of from about 1 to about 10 percent by weight based on the weight of particulate plant nutrient.

16. The controlled release fertilizer material defined in claim 1, wherein the coating is present in an amount in the range of from about 1.5 to about 5.0 percent by weight based on the weight of particulate plant nutrient.

17. The controlled release fertilizer material defined in claim 1, wherein the coating is present in an amount in the range of from about 2.0 to about 4.0 percent by weight based on the weight of particulate plant nutrient.

18. The controlled release fertilizer material defined in claim 1, wherein the ratio of NCO groups from the isocyanate to the hydroxyl groups in the polyol in the mixture is in the range of from about 0.8 to about 3.0.

19. The controlled release fertilizer material defined in claim 1, wherein the ratio of NCO groups from the isocyanate to the hydroxyl groups in the polyol in the mixture is in the range of from about 0.8 to about 2.0.

20. The controlled release fertilizer material defined in claim 1, wherein the ratio of NCO groups from the isocyanate to the hydroxyl groups in the polyol in the mixture is in the range of from about 0.9 to about 1.1.

21. The controlled release fertilizer material defined in claim 1, wherein the amount of organic wax in the mixture is up to about 50 percent by weight based on the combined weight of the organic wax and the polyol.

22. The controlled release fertilizer material defined in claim 1, wherein the amount of oganic wax in the mixture is in the range of from about 1.0 to about 25 percent by weight based on the combined weight of the organic wax and the polyol.

23. The controlled release fertilizer material defined in claim 1, wherein the amount of organic wax in the mixture is in the range of from about 2.0 to about 10 percent by weight based on the combined weight of the organic wax and the polyol.

24. A process for producing a controlled release fertilizer material comprising the steps of:
    (a) contacting a particulate plant nutrient with a mixture comprising:
        a polyol, an isocyanate and an organic wax to produce a coating surrounding the particulate plant nutrient, wherein the polyol comprises castor oil; and
    (b) curing the coating to produce the controlled release fertilizer material.

25. The process defined in claim 24, wherein the particulate material is agitated during Step (a).

26. The process defined in claim 24, wherein Step (a) is conducted at a temperature in the range of from about 50° C. to about 105° C.

27. The process defined in claim 24, wherein Step (a) is conducted at a temperature in the range of from about 60° C. to about 90° C.

28. The process defined in claim 24, wherein Step (a) is conducted at a temperature in the range of from about 70° C. to about 80° C.

29. The process defined in claim 24, wherein Step (a) comprises contacting the particulate plant nutrient with a first stream comprising the polyol and a second stream comprising the isocyanate, the first stream and the second stream being independent of one another.

30. The process defined in claim 29, wherein the first stream comprises a mixture of the polyol and the organic wax.

31. The process defined in claim 29, wherein Step (a) comprises contacting the particulate plant nutrient simultaneously with the first stream and the second stream.

32. The process defined in claim 29, wherein Step (a) comprises contacting the particulate plant nutrient with the first stream followed by the second stream.

33. The process defined in claim 24, wherein Steps (a) and (b) are repeated at least once to produce a controlled release fertilizer material having a plurality of coating layers.

34. The process defined in claim 24, wherein the plant nutrient comprises a water soluble compound.

35. The process defined in claim 34, wherein the water soluble compound comprises a compound containing at least one member selected from the group consisting of nitrogen, phosphorus, potassium, sulfur and mixtures thereof.

36. The process defined in claim 24, wherein the plant nutrient comprises urea.

37. The process defined in claim 24, wherein the polyol comprises from about 2 to about 6 hydroxyl moieties.

38. The process defined in claim 24, wherein the polyol comprises at least one $C_{10}$–$C_{22}$ aliphatic moiety.

39. A process for producing a controlled release fertilizer material comprising the steps of:
    (a) contacting a particulate plant nutrient with a mixture comprising:
        a polyol, an isocyanate and an organic wax to produce a coating surrounding the particulate plant nutrient, wherein the polyol comprises at least one $C_{10}$–$C_{22}$ aliphatic moiety; and
    (b) curing the coating to produce the controlled release fertilizer material.

40. The process defined in claim 24, wherein the isocyanate is selected from the group consisting of diphenylmethane diisocyanate, toluene diisocyanate, aliphatic isocyanates derivatives thereof, polymers thereof and mixtures thereof.

41. The process defined in claim 24, wherein the isocyanate contains from about 1.5 to about 3.0 isocyanate groups per molecule.

42. The process defined in claim 24, wherein the isocyanate contains from about 10% to about 50% NCO.

43. The process defined in claim 24, wherein the isocyanate comprises polymeric diphenylmethane diisocyanate.

44. The process defined in claim 24, wherein the organic wax comprises a drop melting point in the range of from about 50° C. to about 120° C.

45. The process defined in claim 24, wherein the organic wax is substantially non-tacky below a temperature of about 40° C.

46. The process defined in claim 24, wherein organic wax comprises a $C_{30+}$ alpha olefin.

47. The process defined in claim 24, wherein the mixture is used in an amount to provide a coating in an amount in the range of from about 1 to about 10 percent by weight based on the weight of particulate plant nutrient.

48. The process defined in claim 24, wherein the mixture is used in an amount to provide a coating in an amount in the range of from about 1.5 to about 5.0 percent by weight based Li on the weight of particulate plant nutrient.

49. The process defined in claim 24, wherein the mixture is used in an amount to provide a coating in an amount in the range of from about 2.0 to about 4.0 percent by weight based on the weight of particulate plant nutrient.

50. The process defined in claim 24, wherein the ratio of NCO groups from the isocyanate to the hydroxyl groups in the polyol in the mixture is in the range of from about 0.8 to about 3.0.

51. The process defined in claim 24, wherein the ratio of NCO groups from the isocyanate to the hydroxyl groups in the polyol in the mixture is in the range of from about 0.8 to about 2.0.

52. The process defined in claim 24, wherein the ratio of NCO groups from the isocyanate to the hydroxyl groups in the polyol in the mixture is in the range of from about 0.9 to about 1.1.

53. The process defined in claim 24, wherein the amount of organic wax in the mixture is up to about 50 percent by weight based on the combined weight of the organic wax and the polyol.

54. The process defined in claim 24, wherein the amount of organic wax in the mixture is in the range of from about 1.0 to about 25 percent by weight based on the combined weight of the organic wax and the polyol.

55. The process defined in claim 24, wherein the amount of organic wax in the mixture is in the range of from about 2.0 to about 10 percent by weight based on the combined weight of the organic wax and the polyol.

* * * * *